(12) United States Patent
Martel et al.

(10) Patent No.: US 8,718,320 B1
(45) Date of Patent: May 6, 2014

(54) CODIFICATION OF A TIME SERIES OF IMAGES

(75) Inventors: Thomas Martel, Manlius, NY (US); John Freyhof, Wayne, PA (US)

(73) Assignee: Vy Corporation, Wayne, PA (US)

(*) Notice: Subject to any disclaimer, the term of this patent is extended or adjusted under 35 U.S.C. 154(b) by 1374 days.

(21) Appl. No.: 12/012,863

(22) Filed: Feb. 5, 2008

Related U.S. Application Data

(60) Provisional application No. 60/899,555, filed on Feb. 5, 2007, provisional application No. 60/972,284, filed on Sep. 14, 2007.

(51) Int. Cl.
*G06K 9/00* (2006.01)

(52) U.S. Cl.
USPC ......................................... 382/103

(58) Field of Classification Search
CPC ............................................ G06T 7/40
USPC .................... 382/100–107; 348/169–171
See application file for complete search history.

(56) References Cited

U.S. PATENT DOCUMENTS 7,734,112 B1 * 6/2010 Martel .................... 382/266

* cited by examiner

*Primary Examiner* — Atiba O Fitzpatrick
(74) *Attorney, Agent, or Firm* — Neal Blibo LLC

(57) ABSTRACT

Vision pattern recognition is used to discover the presence, position, orientation, and movement of physical objects within electronic representations of data such as images based on the objects' appearance, according to certain embodiments.

13 Claims, 10 Drawing Sheets

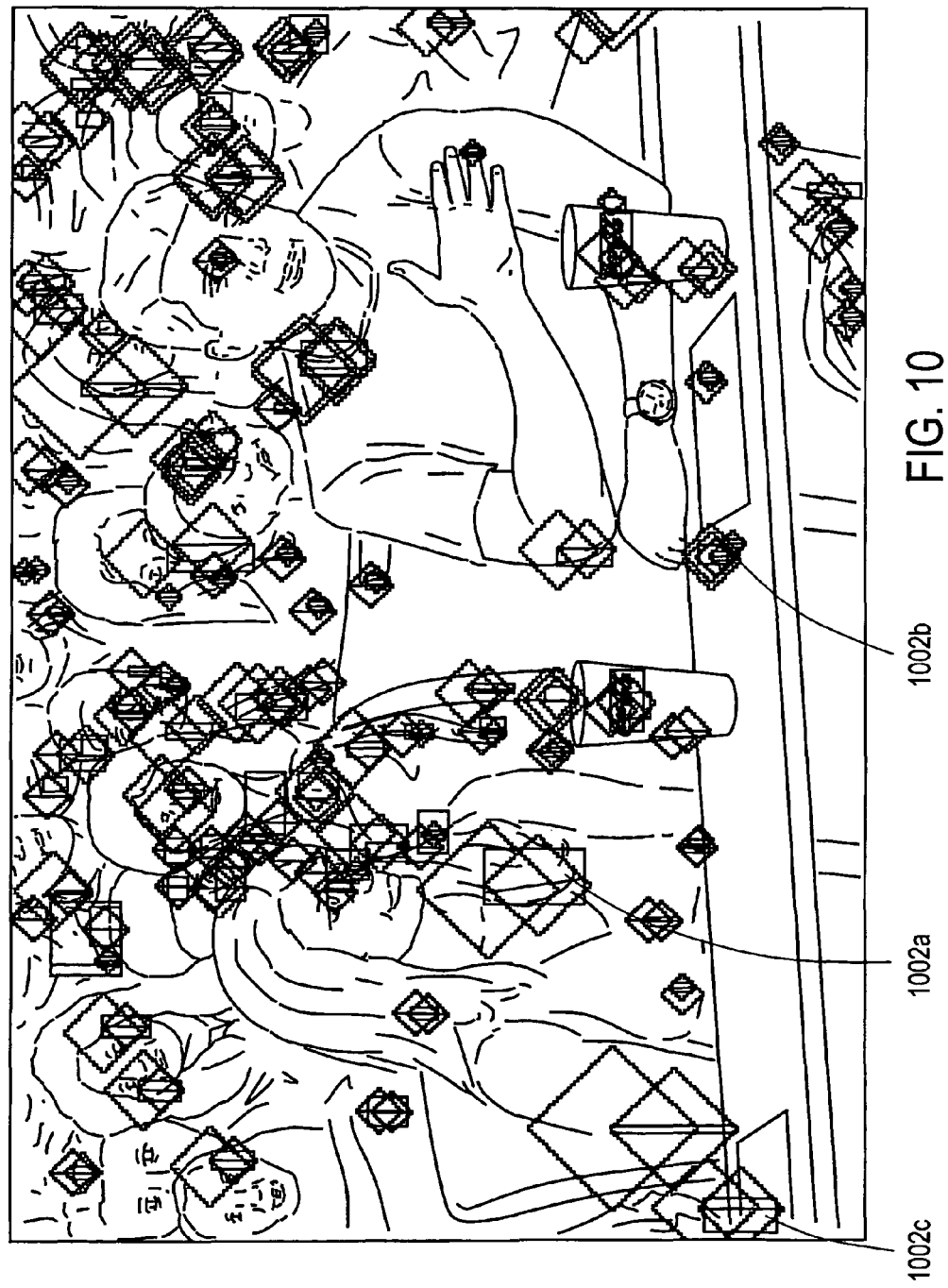

CODIFICATION OF A TIME SERIES OF IMAGES

CROSS REFERENCE TO RELATED APPLICATIONS

This application claims the benefit of U.S. Provisional Patent Application No. 60/899,555 filed Feb. 5, 2007, entitled, "Emergence Order Alpha Prototype" by Thomas Martel and John Freyhof, and U.S. Provisional Patent Application No. 60/972,284, filed Sep. 14, 2007, entitled "Emergence Order Alpha Prototype" by Thomas Martel and John Freyhof, both of which are hereby incorporated by reference in their entirety.

FIELD OF THE INVENTION

The embodiments relate generally to a computer system for the identification of objects within electronically acquired imagery. More specifically, the embodiments relate to a methodology for codifying the physical arrangement of a multiplicity of pixels in which groups of pixels create descriptive data.

BACKGROUND OF THE INVENTION

The general problem of using electronic computers to analyze and interpret electronically acquired video imagery requires an approach that makes it possible to generate large numbers of images from a compact description. Such a compact description may be said to be efficient if a small number of descriptive commands can accurately describe the descriptive data that is being sought.

DESCRIPTION OF DRAWINGS

FIG. 10 shows the same video image from the television program American Idol with all Coke logo rules turned off, according to certain embodiments.

DETAILED DESCRIPTION

Figure 1:
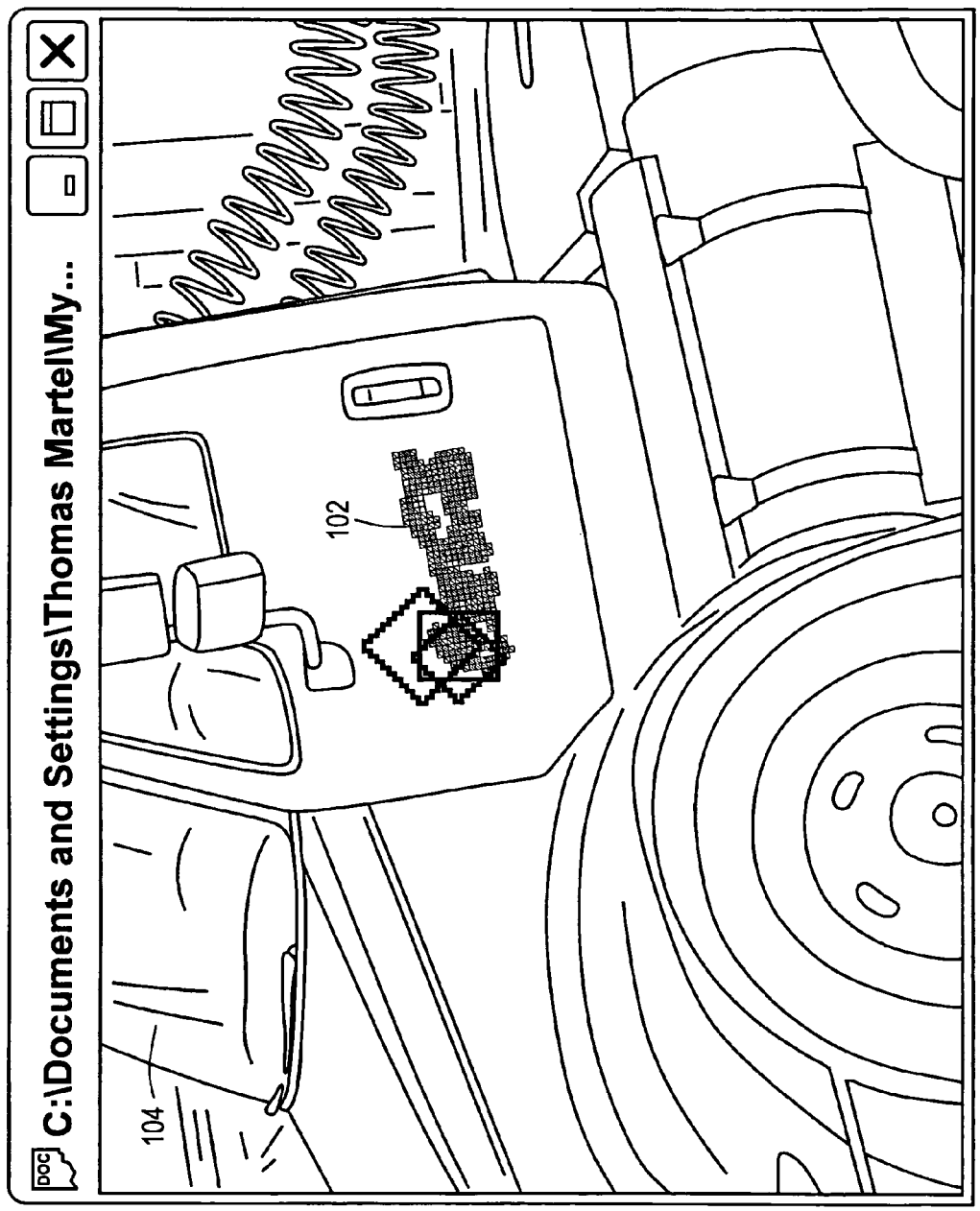
FIGS. 1, 2, and 3 represent a time series of images in which there is relative motion between the objects in the frame and the camera, for example, according to certain embodiments.

Methods, systems, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, useful machine vision pattern recognition methods discover the presence, position, orientation, and movement of physical objects within electronic representations of data such as images based on the objects' appearance. Non-limiting examples of such objects include living creatures and manufactured objects. The process of discovery begins with an unambiguous description of the physical characteristics of the target object. An efficient way of representing these physical characteristics is to draw or otherwise compose a map showing the relative positions of the component parts of these objects.

Gradient Runs and Grenze Sets

The boundaries of the regions are distinguished on the basis of their brightness relative to the brightness of the neighboring pixels which are not positioned on the boundary lines. The numerical value of pixels on such boundaries can be characterized in terms of brightness gradients.

Much of the information present in an electronically acquired image is in the form of brightness gradients that exist within the image. The concept of a "brightness gradient" can be understood in terms of a multiplicity of pixels. A "brightness gradient" is related to the mathematical concept of "gradient." A gradient is a vector quantity that has magnitude and direction. According to certain embodiments, a brightness gradient has magnitude and direction. Because an electronically acquired image is an approximation of the actual physical scene (approximated by means of decomposition into discrete numerical samples, each of which represents the luminosity of the scene at one point), the "brightness gradients" which comprise the information-bearing parts of the electronically acquired image are also approximations by virtue of this sampling process. According to certain embodiments, "brightness gradients" correspond to brightness as characterized by a single composite value which is the summation of all wavelengths of light to which the electronic camera is sensitive (as in the case of "monochrome" cameras, whether they are sensitive to wavelengths of light that are visible to the human eye, or to other wavelengths, such as in infra-red, ultra-violet, or other image sensing means), or to brightness as characterized by a collection of component wavelength ranges, as in the case of electronic cameras that are configured to acquire "color," or multi-spectral, images. The inventive method described herein is applicable to monochromatic images as well as polychromatic (or "color") images.

By the term "gradient" is meant a plurality of neighboring pixels arranged in a line. Frequently, such a linear arrangement will take the form of a straight line oriented in a direction congruent with that of the constituent rows and columns of the pixel array which forms the image. However, the embodiments are not limited to gradient pixel sets that are linear and parallel to the rows and columns of the pixel array which forms the image. Certain embodiments are useful in cases in which the gradient pixel sets form other geometrical shapes, such as open or closed curves, polygons, etc. Furthermore, the concept of a brightness gradient, in the case of color imagery, corresponds to a set of separate co-located gradients. Such a set of separate co-located gradients has a quantity of elements equal to the number of constituent color components detected by the image-forming instrument, according to certain embodiments A set of pixels constituting a gradient can be thought of as a single one-dimensional entity, whether that one-dimensional gradient set is arranged as a straight line segment, or as a curve, or in some other arrangement. For purposes of the descriptive material to follow, this disclosure shall refer to such a one-dimensional gradient set of neighboring pixels as a "gradient run." A gradient run may correspond to a one-dimensional set of pixels oriented in a direction or manner that is other than parallel to the direction of a boundary line between distinct objects within the field of view of the imaging instrument. It is not necessary that the one-dimensional set of pixels be arranged in a line segment, and if the one-dimensional set of pixels is arranged in a line segment, it is not necessary that the direction of this line segment be perpendicular to that of the boundary line marking the division between two or more distinct objects in the field of view of the imaging instrument. The arrangement of the pixels which comprise the gradient runs which embody the gradient information of the electronically acquired image may be simple or complex curves, or may even be closed loops. As a non-limiting example, gradient runs can be formed from sets of pixels arranged diagonally, or at some composite angle neither diagonal nor parallel to the rows or columns of the pixel array that comprises the image.

Thus, gradient runs comprise one-dimensional collections of pixels. In order to address practical images having objects comprising two-dimensional arrays of pixels, two-dimensional gradient representations of the information-bearing regions of electronically-acquired imagery may be used. According to certain embodiments, such two-dimensional gradient representations comprise a plurality of gradient runs. Such two-dimensional gradient representations may also be referred to as "Grenze Sets". As described more fully below, a Grenze Set comprises a plurality of gradient runs that are adjacent to one another, according to certain embodiments.

The disclosed method creates a second order of grouping in which the gradient runs are themselves grouped into larger collections. The criterion by which the first-order gradient pixel groups are assembled into second-order gradient pixel groups is that of proximity. These "second order gradient pixel groups" are referred to herein as Grenze Sets. In certain embodiments, a given first-order gradient pixel group 'A' is added to a second-order gradient pixel group, having one of its two extreme ends 'B' if some or all of the pixels that comprise group 'A' are immediate neighbors of some or all of the pixels contained in 'B.'

The first-order gradient pixel groups (gradient runs) comprise linear collections of adjacent pixels whose brightness is monotone (that is, steadily and without interruption) increasing or decreasing. Each gradient run may also (optionally) continue through those adjacent pixels exhibiting a "flat," or unchanging brightness value. The first pixel of the gradient run will be one having brightness which differs from its immediate neighbor by an amount greater than some threshold 'T'. The last pixel of the gradient run will be that pixel which is the first to interrupt the brightness trend, whether it be increasing or decreasing, by going against this trend. Whether or not those pixels which exhibit a "flat" or unchanging, brightness value over some spatial interval are included within the set of pixels constituting a given gradient run is optional. This concept of the "gradient run" can be applied to the separate color components that are co-located and superimposed, as is the case in multi-colored electronically acquired imagery. In such multi-colored electronically acquired imagery, there may be occasions in which second-order gradient pixel groups may form in one color but not in others, depending upon the hue and shade of the subject material depicted in the electronically acquired image.

Anchor Primitive and View Classes

The specificity of identification of the target object is related to the amount of detail in the description of the physical characteristics of the target object. The more detailed the description, the higher the probability of an accurate discovery or result.

A good description includes a multiplicity of primitives. A primitive is group of pixels that taken together comprise a single indivisible component of order that can be used to define more complex shapes. Primitives are like letters of the alphabet. A page of randomly arranged letters is likely to be meaningless. In contrast, an ordered collection of primitives may correspond to a description of the target object. Non-limiting examples of primitives include a smile, line, corner, arc, circle, curve, line or shape. Primitives can be ranked in order of salience. The first primitive ranked in descending order of salience is called the anchor primitive. As a non-limiting example, the anchor primitive is the largest primitive. The appearance of the anchor primitive will be relatively invariant. Another non-limiting example of an anchor primitive is a primitive that has a distinctive shape and/or color. In other words, a primitive may be selected as an anchor primitive based on some figure of merit determination such as signal-to-noise ratio, for example.

A three-dimensional object may have more than one anchor primitive. At least one anchor primitive is visible for each view class associated with the object. A view class is defined as a range of solid angles over which the appearance of a given three-dimensional object is relatively constant in that the edges of the component parts of the object maintain the same relative position without occluding one another at any viewing angle within the range of solid angles. All views within this range of solid angles are said to be members of the same view class.

The need for multiple anchor primitives becomes apparent in the multiple view class case. It is also possible that more than one anchor primitive may exist in other cases.

Decision Tree Structure

According to certain embodiments, a multiplicity of primitives within any given image can be discovered using the following scheme. The scheme includes provisions for multiple name assignments for each of the discovered primitives and associating such primitives with corresponding elements of a video schematic. Such a scheme resembles a decision tree structure in which the local interpretation of each primitive is validated in terms of its context within the larger schematic.

Creation of a decision tree requires the following elements: 1) a finite descriptive vocabulary, 2) a finite set of transition rules which describe the valid combinations of elements of the descriptive vocabulary, 3) an ordering axis along which the analysis proceeds or unfolds. In the case of item 1, for video schematics, a finite descriptive vocabulary includes a set of objects that are relevant to the task at hand. This represents an important filtering mechanism for limiting the scope of the computational task. For item 2, the finite set of transition rules corresponds to the large scale structure of the objects of interest. For item 3, the ordering axis is a linear or sequential organizational principle analogous to the independent variable in a differential equation.

Sensor Fusion

According to certain embodiments, video schematics can be demonstrated in a single image. For example, in some embodiments, the decision tree of FIG. 6 uses data obtained from the electronically acquired image of FIG. 1 to discover a Coke logo. Further, collecting a constellation of primitives over a time series of frames and linking them together using the decision tree methodology described below as a connected object allows for the identification of video schematics from a moving platform for the purpose of obtaining very accurate information about motion state, precise position, and direction or track. This allows for leveraging the cumulative knowledge obtained from a time series of frames. According to certain embodiments, discovering a three-dimensional object in space is no different than discovering a 2-dimensional object in a series of frames where the third dimension is time. Extensions to this concept could encompass a time series of video frames, images acquired by more than one camera, or even the integration of other electronic information such as radar, lidar, or situational intelligence.

Sensor fusion involves the assimilation of data from multiple independent sources to make better decisions. Using sensor fusion, data from one source is used to corroborate or disprove data from another source. The likelihood of drawing the wrong conclusion from multiple independent sources is lower than drawing the same conclusion from a single source. A single image represents sensor fusion because even a single image comprises a multiplicity of separate measurements that have the following characteristic: the individual measurements are low quality or crude, but taken together, the probability of all the measurements in a given region of the image being erroneous in such a way as to be misleading to the observer is vanishingly small. The process by which the data from many pixels is synthesized into a single conclusion or theory or identification is itself a sensor fusion problem.

Three Images

Figure 2:
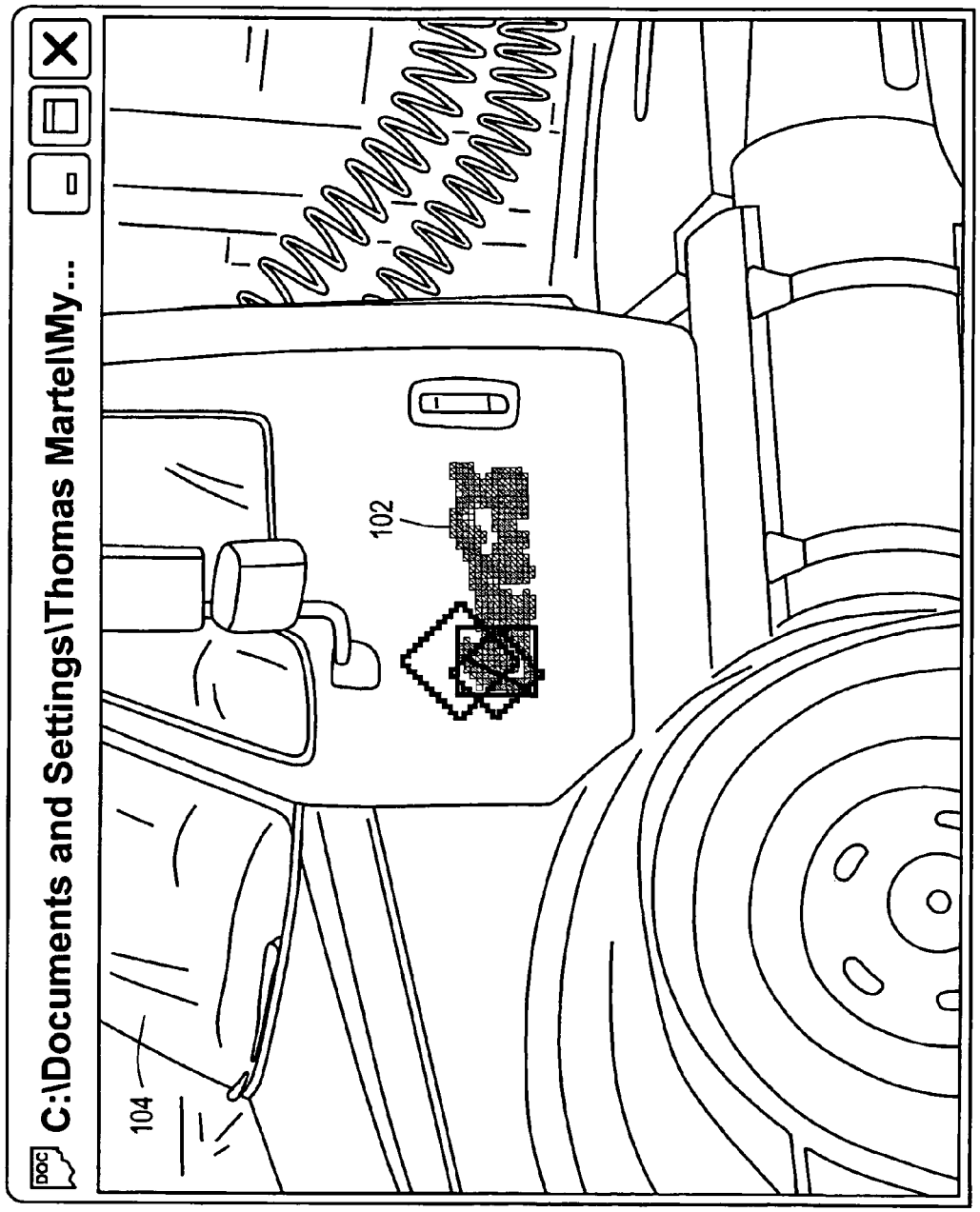
Figure 3:
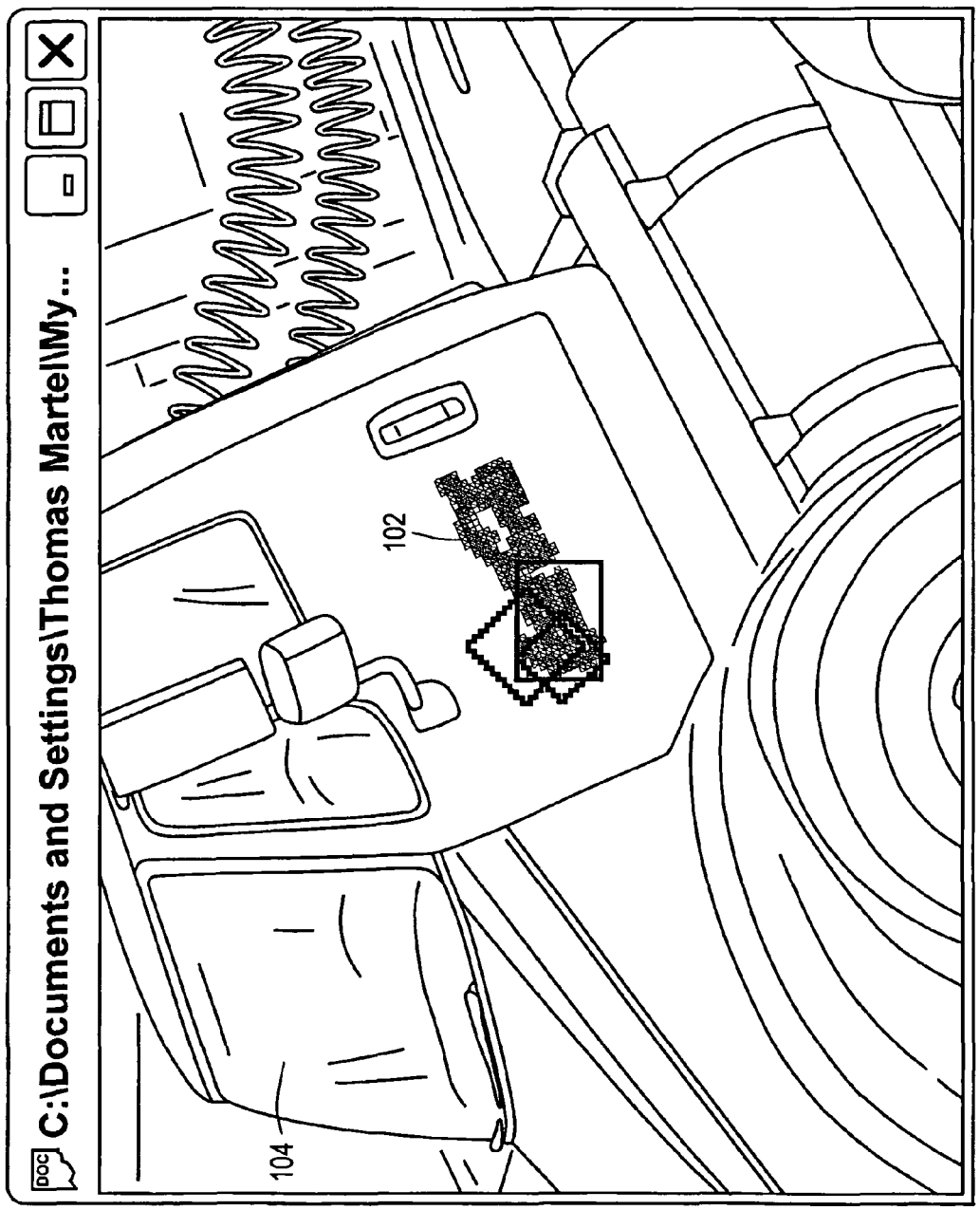
Figure 4:
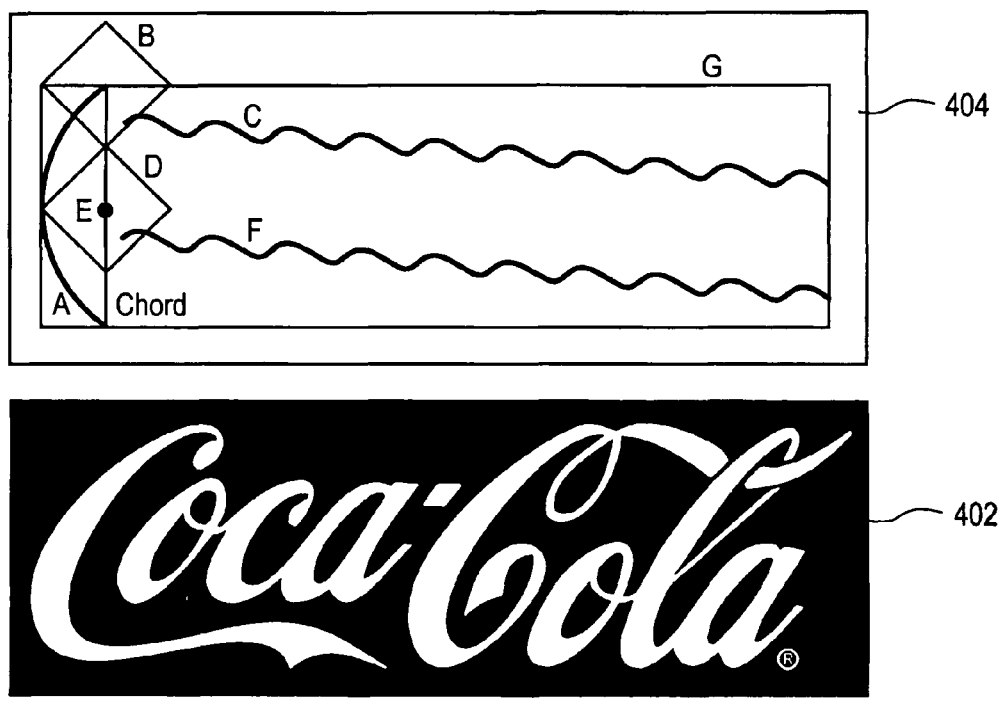
FIG. 4 is a graphical representation of the Coke logo schematic representing a collection of abstract attributes that are related spatially and temporally, according to certain embodiments.

FIGS. 1, 2, and 3 represent a time series of images in which there is relative motion between the objects in the frame and the camera (or other image-capture device). As is apparent to one skilled in the art, the truck 104 in FIGS. 1, 2, and 3, which bears a Coke logo 102 which is the object of interest in this example, may be static or moving, the camera may be static or moving or there may be a combination of movement between the truck and the camera. In the present illustration, this relative motion takes the form of rotation, but it will be apparent to one schooled in the art that this relative motion may include translation. In certain embodiments of the invention, a video schematic is used to detect the Coke logo on the truck. FIG. 4 is a graphical representation of such a schematic. The schematic represents a specific collection of abstract attributes associated with the Coke logo 402 and the spatial and temporal relationships between these attributes are described with reference to FIG. 4 as follows:

A—West smile primitive; Landmark primitive that provides a foundation for a directed search of pixels in the immediate neighborhood.

B—Set of pixels that surround the top most region of the smile primitive. Region centered on the top of the smile primitive.

C—The upper Grenze set looking for order extending outward to the right of the landmark smile.

D—Set of pixels whose location is centered on the line that connects the endpoints of the west smile A.

E—Represents the mid-point of the line that connects the endpoints of the west smile A.

F—Lower Grenze set looking for order extending from the bottom most region of the smile primitive.

G—References the color characteristics of the region to the left of the west smile primitive A.

The rectangle 404 in FIG. 4 represents the region framed by the left most pixel of the anchor primitive A, the top most pixel of anchor primitive A, the bottom most pixel of Landmark primitive A, and the right most point of grenze sets C and F.

Anchor Primitive Identification Using Decision Trees

Figure 5:
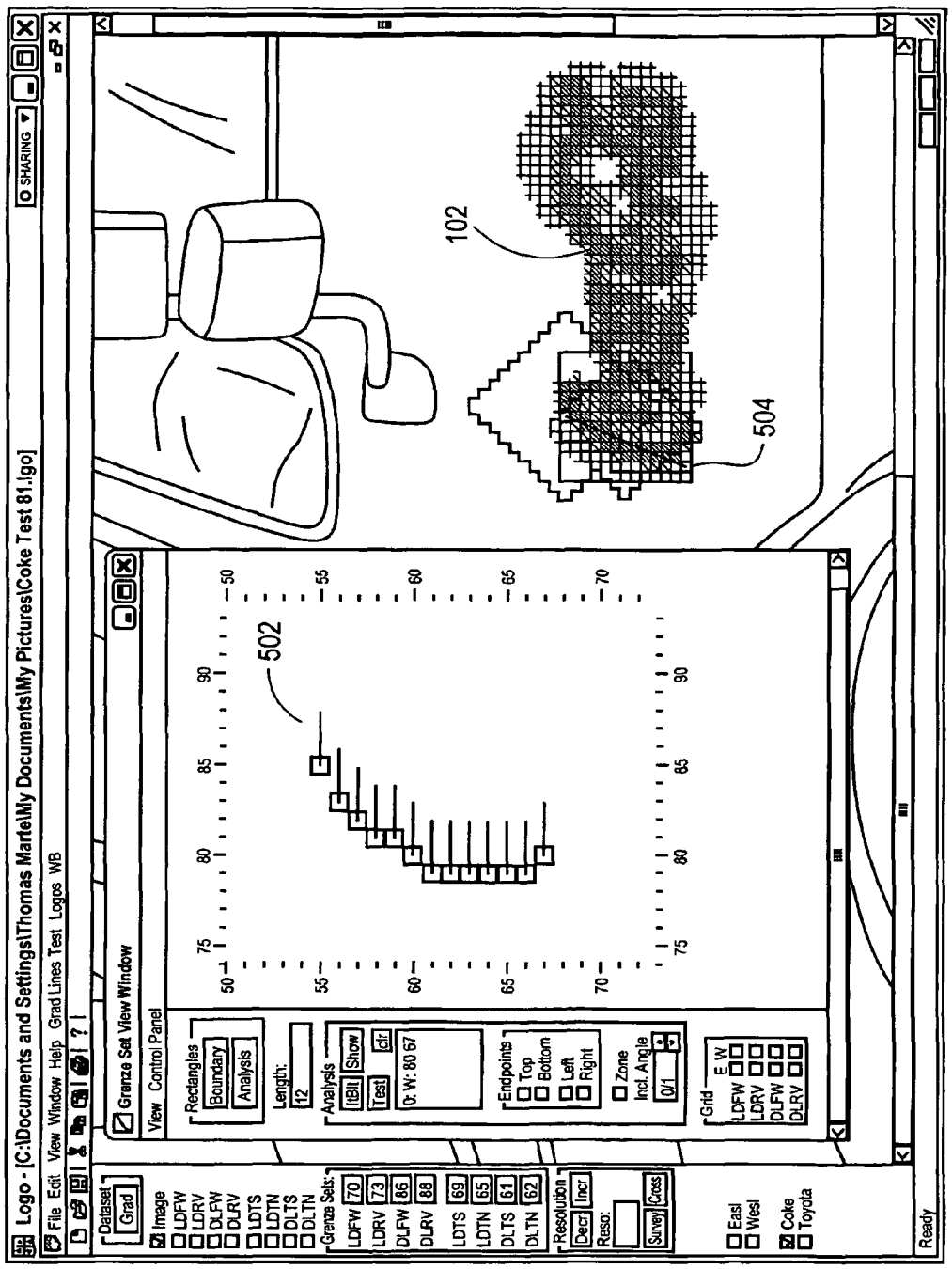
FIG. 5 shows the identification of the anchor primitive for an object of interest, the Coke logo, for example, according to certain embodiments.
Figure 6:
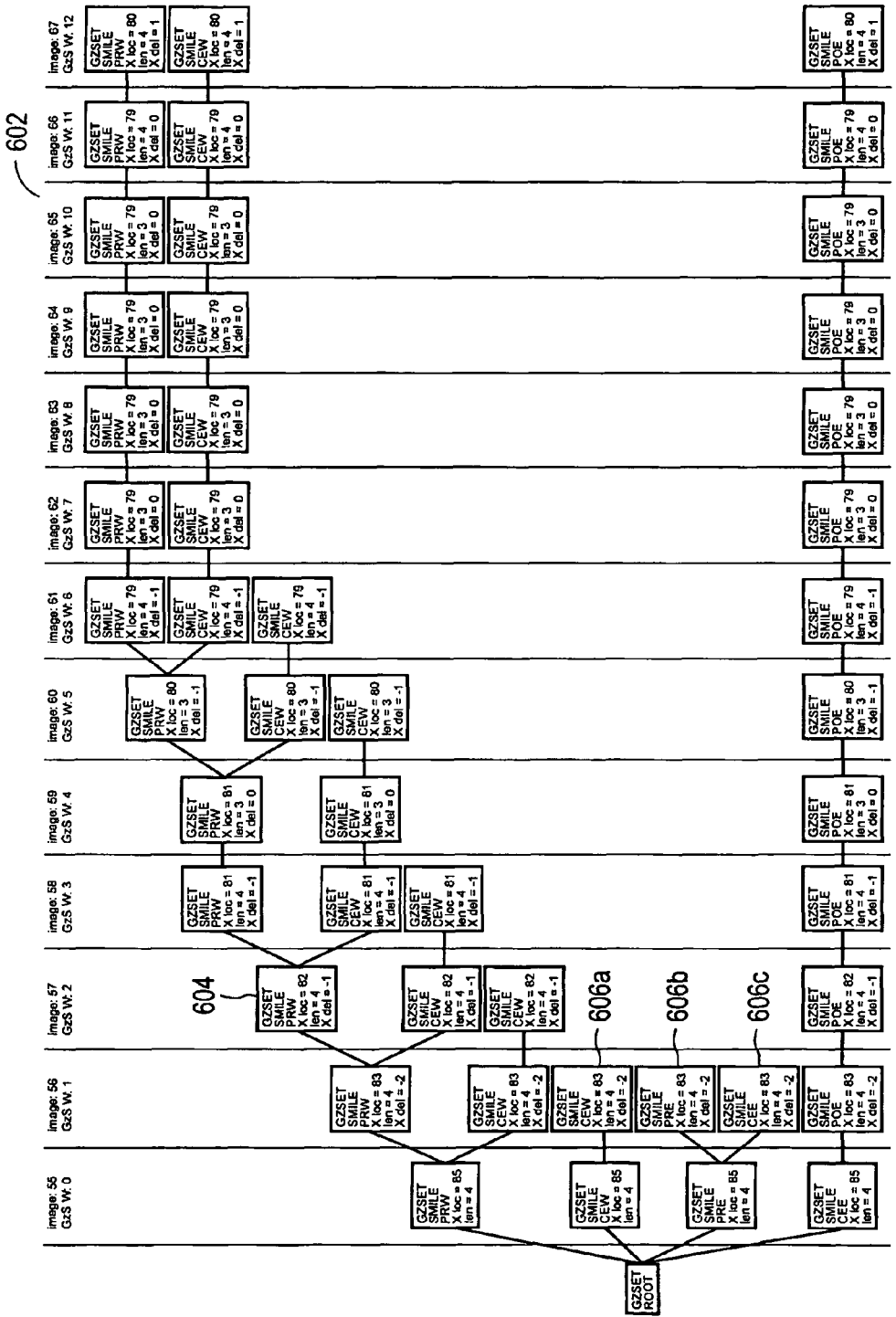
FIG. 6 shows the decision tree that identifies the Coke logo smile primitive in FIG. 1, according to certain embodiments.

In the current example, the Coke video schematic is accomplished using a series of predefined rules that are implemented in software or hardware or in a combination thereof. These rules are referenced to the position, orientation, size and curvature characteristics of the west smile primitive. The analysis that follows references these characteristics. FIG. 5 shows the identification of the west smile anchor primitive 504 found in the imagery of FIG. 1. FIG. 6 shows the decision tree 602 that discovers the smile primitive of the Coke logo.

As a non-limiting example, Table 1 includes sample pseudo-code for the predefined rules for discovering the west smile primitive associated with the Coke logo in this example. FIG. 6 is an example of a decision tree (search tree) based on the pseudo-code of Table 1.

TABLE 1

If a given Grenze set is a "smile," it can be divided into three regions. The naming convention used for these three regions takes into account the type orientation of the smile in question, according to certain embodiments. These regions are called PR (for "pre"), CE (for "center") and PO (for "post"). Grenze sets comprising horizontal gradient runs, for example, will be oriented more or less vertically, although they can slope toward horizontal if their individual gradient runs are long. The names assigned maybe: PRN, PRS, PRE, and PRW for "PR North," "PR South," PR East," and "PR West." In like manner, the CE regions are labeled "CEN," "CES," "CEE," and "CEW." Finally, the PO regions are labeled "PON," "POS," "POE," and "POW."

The PR region of such a Grenze set comprises gradient runs having trigger pixels trending to either the right (in the case of an "east smile") or to the left (in the case of a "west smile") when following the length of the smile, from the top gradient run to the bottom gradient run.

Consider the case of a "west smile." In such a smile, the PRW segment trends to the left. This means that the "X" coordinate (or horizontal coordinate) is trending "negative" In other words, the X coordinate of each gradient run's trigger pixel has a numerical value less than that of the gradient run immediately above it.

At some point, the position trend of the gradient run trigger points reverses, and goes back to the right. From this point down, the "X" coordinate of these gradient runs trends "positive" as one proceeds down the Grenze set. This "positive trending" segment is the POW, or "post" segment.

In between the PRW and POW segments is a segment in which the "X" coordinate of the trigger pixels is trending neither positive nor negative. In this segment, the "X" coordinate of the trigger pixels does not change. These trigger pixels are therefore arranged in a vertical column. This is the CEW, or "center," segment.

The "pseudo-code" for the PRW section of a west smile is organized as follows, according to certain embodiments:
1.    Refer to the Grenze set as "gr."
2.    assign the PRW designation to gr
3.    get next gradient run by incrementing y; call this gradient run gr_prime
4.    if gr_prime x position is less than that of gr, assign gr_prime the PRW designation
4a.  else if gr_prime x position equals x position of gr, assign gr_prime the CEW designation
4b.  else if gr_prime x position is greater than that of gr assign gr_prime the POW designation
5.    repeat this process for each gradient run in the Grenze set
6.    When the last gradient run in the Grenze set is reached, look back along the path that lead to the last gradient run, and check the relative sizes of the PRW, CEW, and POW segments.

TABLE 1-continued

If each is present with a length of at least one, this Grenze set is a valid "smile"

FIG. 6 is an example of a decision tree created by the pseudo-code defined above. For example, in column 3 of FIG. 6, the GZSET SMILE PRW X loc = 82 len = 4 X del = −1 node is a PRW node defined by statement 4. Under the rules, two possible node types can "issue" from this node: another PRW, or a CEW. Both are formed, as shown in the next column of FIG. 6.

While the discussion above relates specifically to a West Smile primitive, the same functional analysis can be applied to an East, North, or South smile In FIG. 5, the anchor primitive 504 for an object of interest, the Coke logo 102 in this case, is identified in a pixel array by systematically accounting for all possible valid interpretations of each one-dimensional gradient run using a plurality of predefined rules, such as those described in Table 1. Such predefined rules specify acceptable deviations from a set of acceptance norms for one-dimensional gradient runs that are consistent with the object of interest. Each interpretation is then systematically tested and invalid interpretations are ignored. Certain embodiments may be implemented using a decision tree 602 as shown in FIG. 6 with a plurality of nodes for systematically accounting for all possible interpretations of each one-dimensional gradient run shown in FIG. 5. Thus, in the examples in FIGS. 5 and 6, each of the one-dimensional gradient runs in the second-order set 502 (Grenze set) of gradient runs shown in FIG. 5 is applied to the decision tree of FIG. 6. Each node of the tree corresponds to an interpretation of a one-dimensional gradient run that is consistent with the object of interest (the West Smile primitive representing the curve of the C in the coke logo in this case). The second-order set of gradient runs is determined to correspond to the object of interest only if each one-dimensional gradient run in the second-order set falls within the acceptance norms associated with a node on the tree.

FIG. 6 is a graphical representation of the smile primitive highlighted in FIG. 5. Each of the individual rectangles (such as rectangle 604) shown in FIG. 6 represents a single hypothetical interpretation of a single gradient run within the smile primitive in FIG. 5. The tree structure in FIG. 6 is divided into columns, each of which corresponds to the left-most pixel of one of the first-order gradient runs which constitute this smile primitive. The column labeled GzSW:0 of FIG. 6 corresponds to the pixel located at x=85 and y=55. Each column is occupied by a multiplicity of individual rectangles, each of which represents one node of a search tree. Each of these nodes represents the possible hypothetical interpretations of this gradient run under the rules for possible primitives for which the image is being examined. In Coke logo example of FIG. 6, there are two such primitives for which the image is being examined. These two primitives are referred to as a "West Smile" and an "East Smile."

Thus in column GzSW:0, there are four node rectangles, two of which correspond to hypothetical "West Smiles," and two of which correspond to hypothetical "East Smiles." The "West Smile" nodes are labeled GZSET SMILE PRW and GZSET SMILE CEW. The "East Smile" nodes are labeled GZSET SMILE PRE and GZSET SMILE CEE. Here the GZSET SMILE nomenclature indicates "Grenze Set: Smile," and the abbreviations PRW, CEW, PRE, and CEE indicate "Pre-West, Center West, Pre-East, and Center East. "Pre-West" refers to those first-order gradient run which comprises that part of the smile occurring "before" (that is, to the north of," in the top-to-bottom top to bottom ordering scheme imposed by the sway in which data is taken from the image) the purely vertical part of the smile. "Center West" means those first order gradient runs which comprise that part of the smile constituting a "purely vertical" interval of first-order gradient runs, or that set of first-order gradient runs having "trigger" pixels arranged in an unbroken vertical array. The starting pixel of a given gradient run is referred to as a "trigger" pixel.

In the column labeled GzSW:1 there are six nodes. Two of these nodes are spawned from the PRW node, one from the CEW node, two from the PRE node, and one from the CEE node. Each of these six nodes represents a separate hypothetical interpretation of the "meaning" of the first-order gradient run that begins with the pixel at x=83, y=56, as shown in FIG. 5.

The PRW node (or "Pre-West" node) spawns another PRW node, and a CEW node. Each of these nodes represents a "forward looking" hypothesis. Thus, the determination of whether or not a given node's hypothetical meaning is correct is deferred until that node is actually created, and perhaps, even longer. In this way, a given branch of the decision tree can be made to persist until sufficient information has been collected by that branch (by looking out, or forward, along the Grenze set that is under evaluation) to settle unambiguously the question of whether or not the associated chain of hypothetical interpretations is the correct one under the set of predefined rules which specify acceptable deviations from a set of acceptance norms for one-dimensional gradient runs that are consistent with an object of interest. In the present example, sufficient information for "pruning," or terminating the column GzSW:0 descendant nodes is present for three of the six descendant nodes in column GzSW:1. Thus, three of the column GzSW:1 node "survive" to spawn descendants of their own, and three "fail." The three "failing," or "terminal" nodes in column GzSW:1 are shown as 606a, 606b, and 606c in FIG. 6.

This analytical sequence continues for each of the eleven remaining first-order gradient runs in a given Grenze Set, such as the Grenze set of FIG. 5. For this Grenze set, as can be seen in column GzSW:12, a "West Smile" primitive is successfully identified. This successful outcome represents the unambiguous identification of a "West Smile;" and the unambiguous nature of this identification is possible only because the "final verdict", as it were, is deferred, or delayed, until enough information has accumulated along the "path of hypotheses" to remove all doubt as to the correct naming scheme for each of the first-order gradient runs encountered along the length of the Grenze Set.

Figure 7:
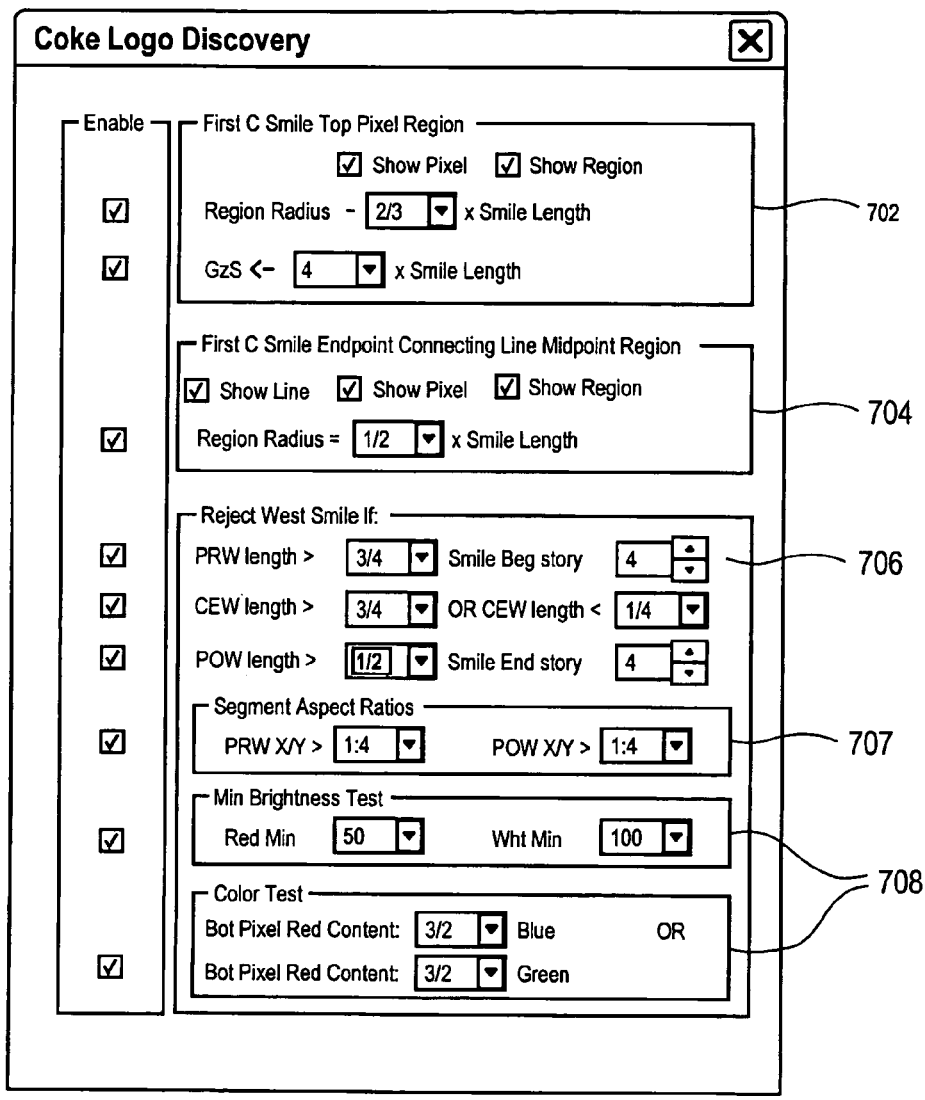
FIG. 7 outlines the predefined rules to identify the Coke logo as represented in FIG. 1, according to certain embodiments.

A non-limiting example of a set of predefined rules that are specific to the Coke logo example and used for identifying the Coke logo are represented in FIG. 7, and can be described further as follows. The first C Smile Top Pixel region 702 of FIG. 7 describes the diamond shaped region labeled B in FIG. 4. A diamond was used because it is an approximation of a circle and can be used to define the region radius. The radius of this region is itself determined by the size of the West smile anchor primitive. It is not a constant and depends upon the size of the smile. If the smile is larger, then the region is larger. This region is used to direct the discovery of another element of the Coke logo description which is a Grenze set boundary line that proceeds in a direction that is approximately horizontal and off to the right of the anchor primitive and which has its left endpoint somewhere in region B. A grenze set is a two-dimensional gradient representation comprising a plurality of gradient runs that are adjacent to one another. The size and endpoint data of the anchor smile primitive whose size varies in proportion to the anchor primitive. This area must include within it the left most endpoint of another approximately horizontal Grenze set. The maximum permitted length of this Grenze set is also determined by the length of the anchor primitive, which is the West Smile primitive in this example. Thus, in this example, the Grenze set is to be no more than four times the length of the anchor primitive.

The first C smile connecting line midpoint region 704 of FIG. 7 is another approach to use a diamond to approximate a circle. The location of this region is determined by the anchor primitive. In this example, the center of the region is the midpoint of the straight line that connects the two endpoints of the anchor primitive. This region corresponds to D and the center corresponds to E on FIG. 4. The "radius" of region D is determined by the size of the anchor primitive and is expressed as a ratio of that size. Both of the diamond shaped regions B and D in FIG. 4 are proportionate to the size of the anchor smile primitive. In B the constant of proportionality is two-thirds of the length of the smile and in D the constant of proportionality is one-half the length of the smile.

The next set of rule parameters 706, "Reject West Smile If," characterize the shape of the smile primitive. The terminology PRW, CEW, and POW stands for "pre-west," "center-west," and "post-west." These terms describe three separate regions into which the discovery process resolves the smile. The discovery process characterizes permissible limits on the shape of the smile by constraining the lengths of these three regions to limits whose numerical values are in proportion to the overall length of the smile. By so doing, crude constraints are imposed on the shape and continuity characteristics of the smile. The same is true of the next category called "Segment Aspect Ratios" 707. These parameters PRW X/Y and POW X/Y describe the width-to-height ratio of rectangles enclosing regions The final set of rule parameters 708 encompasses a minimum brightness test and a color test, both of which relate to a single pixel at the southern most gradient run of the anchor west smile primitive. The "Min Brightness Test" prevents an evaluation of a potential occurrence of a Coke logo if the brightness of the selected pixel is less than a certain threshold value. The validity of a color check is indeterminate if the brightness is too low. This test looks at the value of red present and the value of white present for the Coke logo example. If there is not enough red or white color present, the candidate smile primitive is eliminated as a potential Coke logo. In FIG. 7, the minimum red component is defined as 50 and the minimum white or luminosity component is 100. This test was done because color is not well defined at low brightness levels and the Coke logo is characterized by the presence of a certain amount of red.

A second test, the "Color Test," is dependent on the affirmative outcome of the "Min Brightness Test." This test is looking for a minimum content of red color by measuring the ratio of red color to blue or red color to green. If the amount of red content exceeds the amount of blue content, or if the amount of red exceeds the amount of green content by the specified numerical limit, then the candidate Smile Primitive is not rejected.

Figure 8:
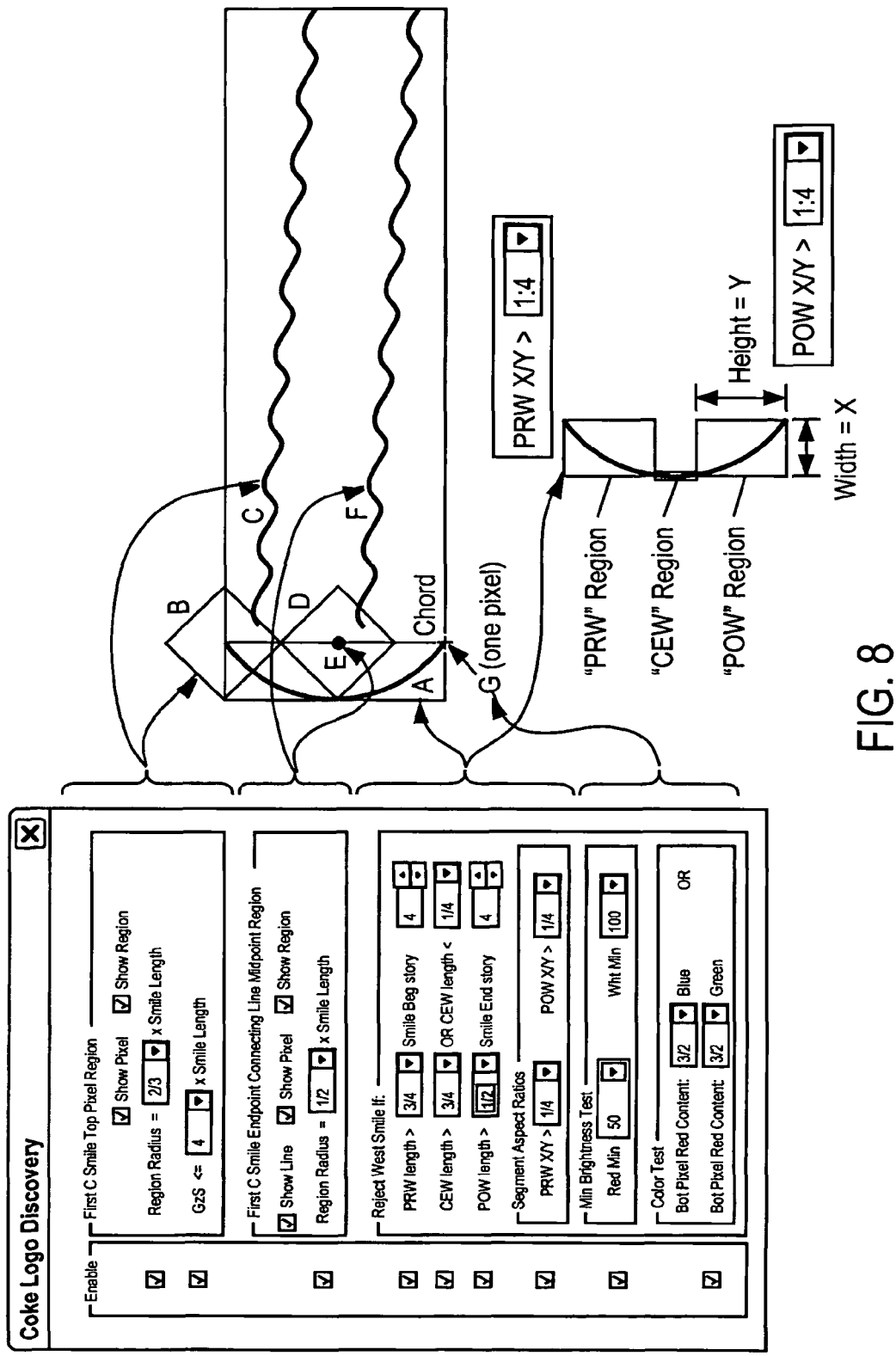
FIG. 8 shows how the Coke Logo Discovery Rules in FIG. 7 relate to the Coke Video Schematic in FIG. 4, according to certain embodiments.

FIG. 8 shows how the Coke Logo Discovery Rules in FIG. 7 relate to the Coke Video Schematic in FIG. 4. The "First C Smile Top Pixel Region" rules relate to region B, the set of pixels that surrounds the top most region of the smile primitive, and to the feature labeled C, the upper grenze set, which responds to order extending outward and to the right of the landmark smile. The "First C Smile Endpoint Connecting Line Midpoint Region" rules relate to region D and features E and F. Region D is the set of pixels whose location is centered on the line that connects the endpoints of the west smile A. E represents the mid-point of the line that connects the endpoints of the west smile A. Feature F is the lower grenze set looking for order extending from the bottom most region of the smile primitive. The "Reject West Smile If" rules relate to Region A, a West smile landmark primitive that provides the foundation for a search of pixels in the immediate neighborhood. The breakout box describes three regions, PRW, CEW, and POW (Pre-West, Center-West, and Post-West) which provide crude constraints to describe the shape of the west smile anchor primitive. PRW X/Y and POW X/Y represent the ratios of the width to the height of the west smile primitive being evaluated. The "Min Brightness Test" and "Color Test" relate to feature G, a single pixel at the southern most gradient run of the anchor west smile primitive. The "Min Brightness Test" prevents an evaluation of a potential occurrence of a Coke logo if the brightness of the selected pixel is less than a certain threshold value. The "Color Test," is dependent on the affirmative outcome of the "Min Brightness Test" and looks for a minimum content of red color by measuring the ratio of red color to blue or red color to green.

Figure 9:
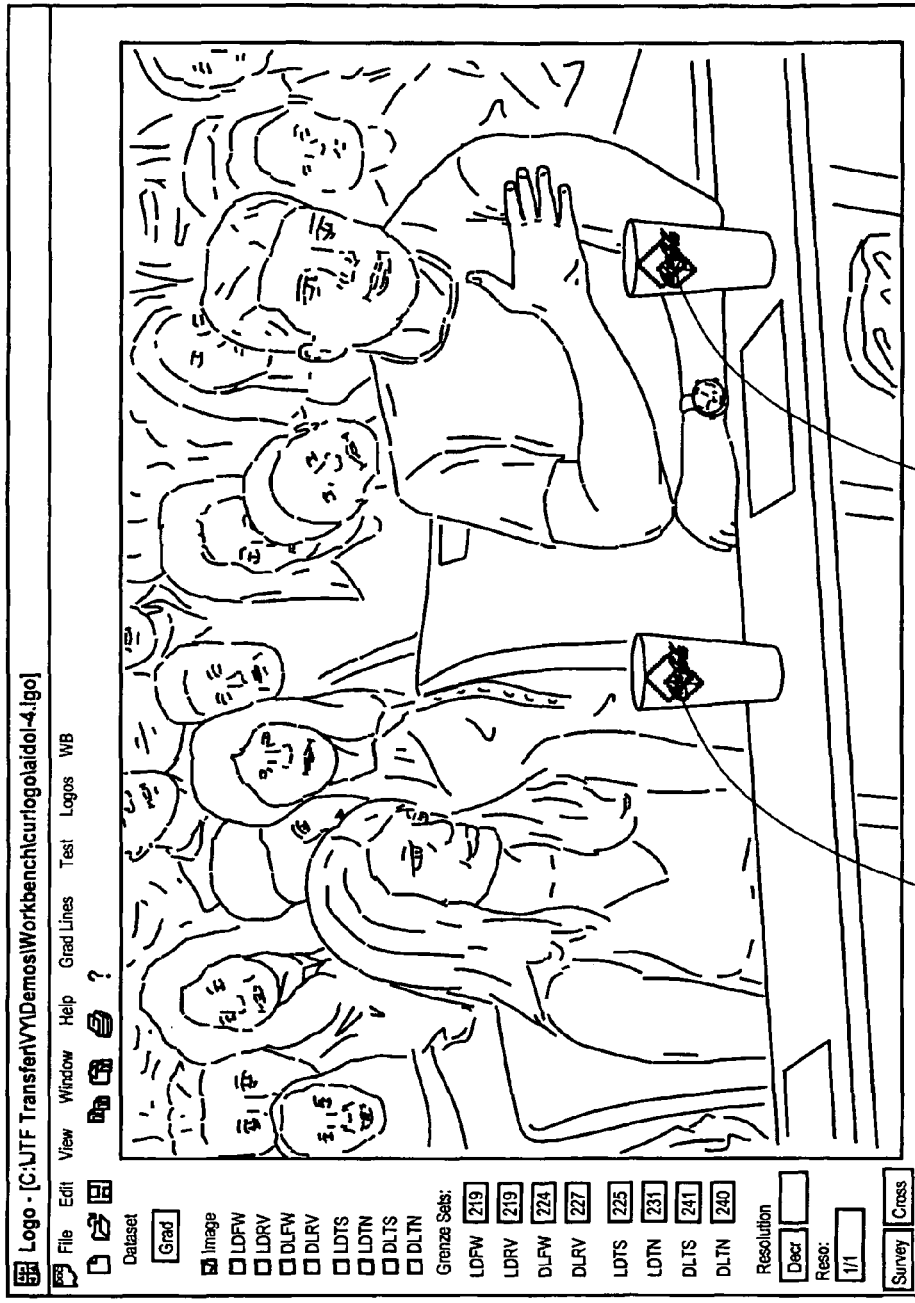
FIG. 9 shows a video image from the television program American Idol and demonstrates the impact of the rules to find order within electronically acquired imagery, according to certain embodiments.

FIGS. 9 and 10 show a video image from the television program American Idol and demonstrate the impact of the rules previously described to find order within electronically acquired imagery. In FIG. 9, with the rules for determining the anchor primitive and Coke Logo discovery rules turned on, the two Coke logos (902a, 902b) are correctly identified to be present in the image with no false positives. In FIG. 10, with the rules turned off, there are over sixty false positives (for example, false positives 1002a, 1002b, 1002c, etc) indicating the presence of a west smile, but not necessarily the presence of the Coke logo.

The teachings of the present invention may be used for analysis of video images to identify objects such as product logos, cars, weapons, people and other objects of interest. The illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for identifying a target object, the method comprising:
    determining, based on a first pre-determined set of criteria, one or more first order collections of pixels comprising a plurality of one-dimensional gradient runs in electronically acquired images of the target object;
    creating one or more second order collections of pixels from the one or more first order collections of pixels based on a second pre-determined set of criteria;
    using a decision tree to discover one or more primitives corresponding to the one or more second order collections of pixels, including identification of an anchor primitive, based on a third pre-determined set of criteria including known characteristics of the target object; and
    identifying the target object based on the one or more discovered primitives,
    wherein a primitive is a group of pixels that taken together comprise a single indivisible component of order that can be used to define a more complex shape and the anchor primitive is a first primitive ranked in a descending order.

2. The method of claim 1, further comprising describing the known characteristics of the target object using an ordered collection of the one or more primitives.

3. The method of claim 1, wherein the anchor primitive provides a starting point for a directed search of pixels surrounding the anchor primitive.

4. The method of claim 1, wherein using the decision tree to discover the one or more primitives further comprises identifying more than one anchor primitive if the target object is three-dimensional.

5. The method of claim 1, wherein using the decision tree to discover the one or more primitives further comprises providing multiple name assignments for respective discovered primitives.

6. The method of claim 1, further comprising using the decision tree to collect a constellation of primitives over a time series of the electronically acquired images, assigning names to respective primitives in the constellation and linking the respective primitives as a connected object.

7. The method of claim 6, further comprising determining angular evolution of position and distance of a series of anchor primitives based on analysis of the connected object.

8. The method of claim 1, further comprising analyzing images that are electronically acquired using more than one image acquisition system.

9. The method of claim 1, further comprising integrating electronic information associated with the target object, the electronic information including at least one of a set comprising: radar information, lidar information, global positioning information, geospatial information, inertial guidance situational intelligence information, and data arising from electronic sources.

10. The method of claim 1, further comprising acquiring the electronically acquired images when the target object is moving relative to a corresponding image acquisition system.

11. The method of claim 1, further comprising acquiring the electronically acquired images when the target object is static relative to a corresponding image acquisition system.

12. The method of claim 1, further comprising determining relative motion between the target object and a corresponding image acquisition system.

13. The method of claim 1, wherein the one or more discovered primitives include smile, line, corner, arc, circle, curve, line or shape types.

* * * * *